(12) United States Patent
Lee et al.

(10) Patent No.: US 8,866,999 B2
(45) Date of Patent: Oct. 21, 2014

(54) LIQUID CRYSTAL DISPLAY DEVICE AND METHOD FOR MANUFACTURING THE SAME

(71) Applicant: LG Display Co., Ltd., Seoul (KR)

(72) Inventors: Jung Il Lee, Gyeonggi-do (KR); In Jae Chung, Gyeonggi-do (KR); Kang Il Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/050,290

(22) Filed: Oct. 9, 2013

(65) Prior Publication Data

US 2014/0036190 A1    Feb. 6, 2014

Related U.S. Application Data

(62) Division of application No. 13/151,715, filed on Jun. 2, 2011, now Pat. No. 8,587,760.

(30) Foreign Application Priority Data

Jun. 7, 2010 (KR) ........................ 10-2010-0053387

(51) Int. Cl.
| | |
|---|---|
| G02F 1/1335 | (2006.01) |
| G02F 1/1333 | (2006.01) |
| G02F 1/1343 | (2006.01) |
| G02F 1/1368 | (2006.01) |
| G02F 1/1362 | (2006.01) |
| G02F 1/1341 | (2006.01) |

(52) U.S. Cl.
CPC ...... G02F 1/13624 (2013.01); *G02F 2001/136236* (2013.01); G02F 1/133371 (2013.01); *G02F 1/133514* (2013.01); G02F 1/134363 (2013.01); G02F 1/1368 (2013.01); *G02F 2001/13629* (2013.01); *G02F 1/1341* (2013.01)
USPC ............................................ 349/107; 349/138

(58) Field of Classification Search
None
See application file for complete search history.

(56) References Cited

U.S. PATENT DOCUMENTS

| | | | |
|---|---|---|---|
| 6,683,592 B1 * | 1/2004 | Murade | 349/107 |
| 2004/0046924 A1 | 3/2004 | Kim et al. | |
| 2005/0270449 A1 * | 12/2005 | Koma et al. | 349/114 |
| 2006/0152659 A1 | 7/2006 | Ishihara et al. | |
| 2006/0227277 A1 * | 10/2006 | Oh | 349/149 |
| 2007/0076144 A1 * | 4/2007 | Okita et al. | 349/107 |
| 2008/0012017 A1 | 1/2008 | Jung | |
| 2008/0137017 A1 * | 6/2008 | Arai et al. | 349/139 |
| 2010/0007840 A1 | 1/2010 | Oh | |

* cited by examiner

*Primary Examiner* — Bumsuk Won
*Assistant Examiner* — Ryan Crockett
(74) *Attorney, Agent, or Firm* — Morgan, Lewis & Bockius LLP (57) ABSTRACT

Disclosed is an LCD device which facilitates to improve transmittance for each colored light by a design capable of realizing an optimal cell gap for each of sub-pixels, and a method for manufacturing the same. The LCD device comprises first and second substrates confronting each other; a liquid crystal layer between the first and second substrates; and first, second, and third sub-pixels, wherein a cell gap of the first sub-pixel is larger than a cell gap of the third sub-pixel.

7 Claims, 7 Drawing Sheets

[ Related Art ]

FIG.1A

[ Related Art ]

LIQUID CRYSTAL DISPLAY DEVICE AND METHOD FOR MANUFACTURING THE SAME

CROSS REFERENCE TO RELATED APPLICATIONS

This application is a divisional of U.S. patent application Ser. No. 13/151,715, filed on Jun. 2, 2011, which claims the benefit of the Korean Patent Application No. 10-2010-0053387, filed on Jun. 7, 2010, the entire disclosure of each of which is hereby incorporated by reference as if fully set forth herein for all purposes.

BACKGROUND

1. Field of the Invention

The present invention relates to a liquid crystal display (LCD) device, and more particularly, to an LCD device with good transmittance.

2. Discussion of the Related Art

A liquid crystal display (LCD) device may be widely used in various fields of notebook computer, monitor, spacecraft, aircraft, and etc. owing to advantages of low driving voltage, low power consumption and portability.

The LCD device includes a lower substrate, an upper substrate, and a liquid crystal layer between the lower and upper substrates. Liquid crystal molecules in the liquid crystal layer are aligned according to an application of electric field, whereby light transmittance is adjusted based on the alignment of liquid crystal molecules, to thereby display images on the LCD device.

Hereinafter, a related art LCD device will be described with reference to the accompanying drawings.

Figure 1A:
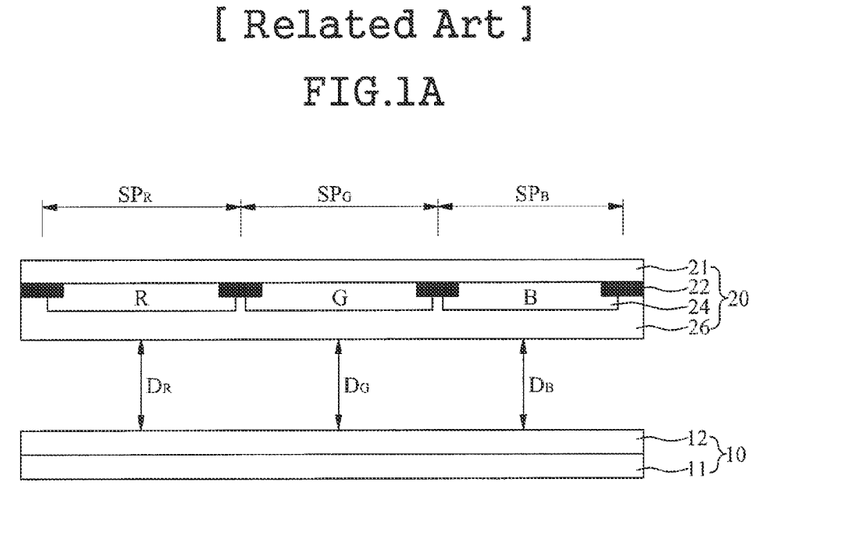
FIG. 1A is a cross section view illustrating a related art LCD device.

FIG. 1A is a cross section view illustrating a related art LCD device.

As shown in FIG. 1A, the related art LCD device includes a lower substrate 10, an upper substrate 20, and a liquid crystal layer (not shown) between the lower and upper substrates 10 and 20.

The lower substrate 10 comprises a lower base 11 and a device layer 12, wherein the device layer 12 is formed on the lower base 11. The device layer 12 may comprise a thin film transistor, a pixel electrode, and a common electrode.

The upper substrate 20 comprises an upper base 21; light-shielding layers 22; red(R), green(G), and blue(B) color filter layers 24; and an overcoat layer 26. In this case, the light-shielding layers 22 are formed on the upper base 21; the red red(R), green(G), and blue(B) color filter layers 24 are respectively formed between each of the light-shielding layers 22; and the overcoat layer 26 is formed on the color filter layers 24.

The related art LCD device comprises plural pixels, wherein each pixel is capable of realizing various colors by combining red(R)-colored sub-pixel ($SP_R$), green(G)-colored sub-pixel ($SP_G$), and blue(B)-colored sub-pixel ($SP_B$).

However, a cell gap ($D_R$) of the red(R)-colored sub-pixel ($SP_R$), a cell gap ($D_G$) of the green(G)-colored sub-pixel ($SP_G$), and a cell gap ($D_B$) of the blue(B)-colored sub-pixel ($SP_B$) are the same in the related art LCD device. Thus, there are limits to improvement of transmittance. This will be explained in detail as follows.

Figure 1B:
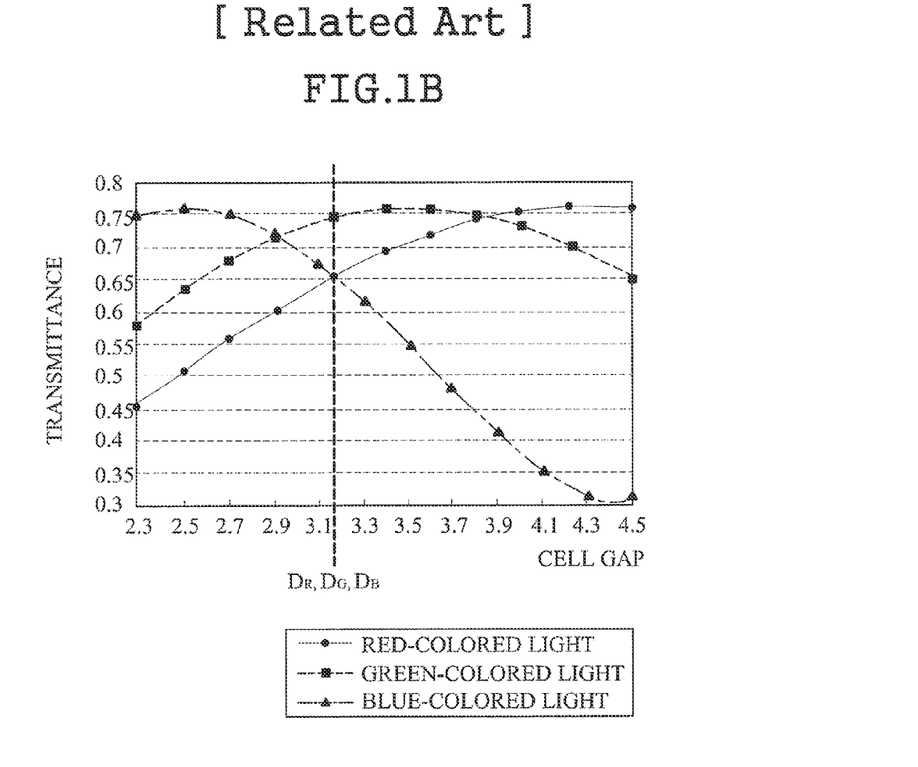
FIG. 1B is a graph illustrating the change in transmittance tor each color according to a cell gap.

FIG. 1B is a graph illustrating the change in light transmittance for each color according to the cell gap. As shown in FIG. 1B, according as the cell gap increases, the red(R)-colored light transmittance and green(G)-colored light transmittance are gradually increased, and are then decreased. Meanwhile, the blue(B)-colored light transmittance is gradually decreased together with the increase of cell gap.

As known from the related art LCD device, when the cell gap ($D_R$) of the red(R)-colored sub-pixel ($SP_R$), the cell gap ($D_G$) of the green(G)-colored sub-pixel ($SP_G$), and the cell gap ($D_B$) of the blue(B)-colored sub-pixel ($SP_B$) are the same, it is difficult to maximize the transmittance for each of the colored light.

That is, in case of the related art, the cell gaps ($D_R$, $D_G$, $D_B$) of all sub-pixels are set to be identical with respect to the point where the green(G)-colored light transmittance is high. In this case, the red(R)-colored light and blue(B)-colored light transmittances are relatively lowered so that the entire transmittance of the LCD device is also lowered.

SUMMARY

Accordingly, the present invention is directed to an LCD device and a method for manufacturing the same that substantially obviates one or more problems due to limitations and disadvantages of the related art.

An aspect of the present invention is to provide an LCD device which facilitates to improve transmittance for each colored light by differently setting a cell gap in each sub-pixel, and a method for manufacturing the same.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there provided an LCD device comprising: first and second substrates confronting each other; a liquid crystal layer between the first and second substrates; and first, second, and third sub-pixels, wherein a cell gap of the first sub-pixel is larger than a cell gap of the third sub-pixel.

In another aspect of the present invention, there is provided a method for manufacturing an LCD device including first, second, and third sub-pixels comprising: forming a first photoresist pattern on a first base, and forming a groove in the first base by etching a predetermined portion of the first base under the conditions that the first photoresist pattern is used as a mask; forming a conductive material layer on an entire surface of the first base; remaining the conductive material layer in the groove, and removing the photoresist pattern and the conductive material layer thereon; forming agate insulating film on the entire surface of the first base including the conductive material layer, and forming a semiconductor layer, a source electrode, and a drain electrode on the gate insulating film; forming a passivation film on the entire surface of the first base including the source and drain electrodes, and forming a second photoresist pattern on the passivation film; removing predetermined portions of the passivation film, the gate insulating film, and the conductive material layer under the conditions that the second photoresist pattern is used as a mask; and forming a pixel electrode electrically connected with the drain electrode, and forming a common electrode arranged in parallel to the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a liquid crystal display (LCD) device according to one embodiment of the present invention and a method for manufacturing the same will be described with reference to the accompanying drawings.

Figure 2A:
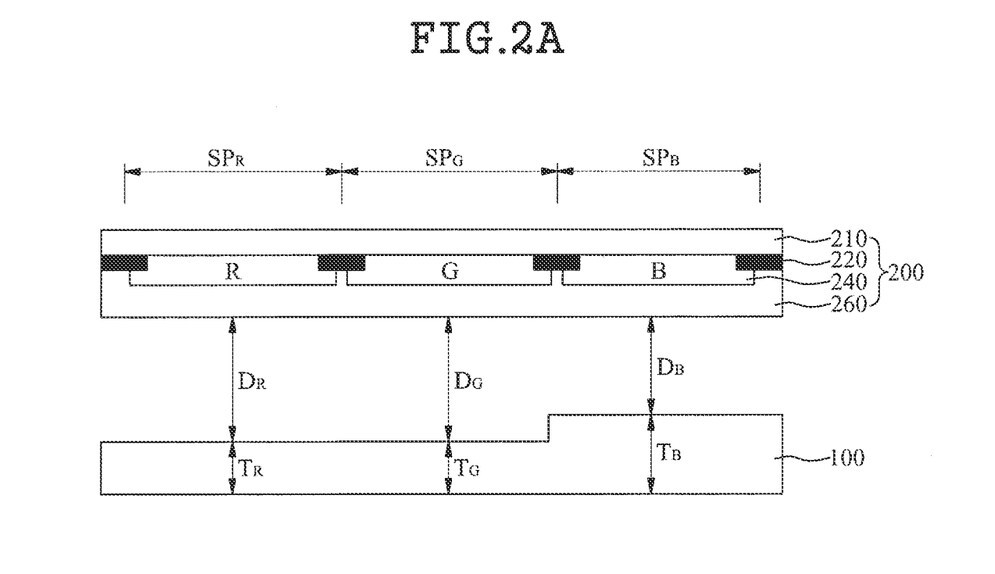
FIG. 2A is a cross section view illustrating an LCD device according to one embodiment of the present invention.
Figure 2B:
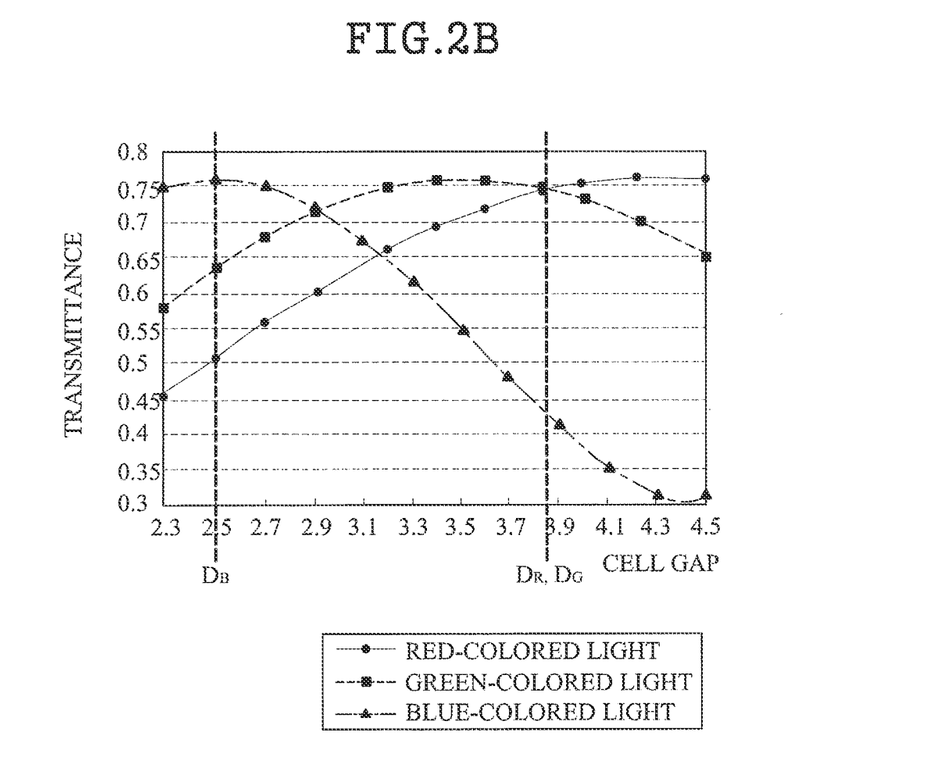
FIG. 2B is a graph illustrating a cell gap in each sub-pixel in the LCD device according to one embodiment of the present invention.

FIG. 2A is a cross section view illustrating an LCD device according to one embodiment of the present invention. FIG. 2B is a graph illustrating a cell gap in each sub-pixel in the LCD device according to one embodiment of the present invention.

As shown in FIG. 2A, the LCD device according to one embodiment of the present invention includes a first substrate 100, a second substrate 200, and a liquid crystal layer (not shown) between the first and second substrates 100 and 200.

The first substrate 100, although not shown, comprises a first base; and a device layer on the first base. The device layer may comprise a thin film transistor, a pixel electrode, and a common electrode.

The second substrate 200 comprises a second base 210; light-shielding layers 220 on the second base 210; red(R), green(G), and blue(B) color filter layers 240 between each of the light-shielding layers 220; and an overcoat layer 260 on the color filter layers 240.

The LCD device according to one embodiment of the present invention comprises plural pixels; wherein each pixel is formed by combining red(R)-colored sub-pixel ($SP_R$), green(G)-colored sub-pixel ($SP_G$), and blue(B)-colored sub-pixel ($SP_B$).

In this case, a cell gap ($D_R$) of the red(R)-colored sub-pixel ($SP_R$) is larger than a cell gap ($D_B$) of the blue(B)-colored sub-pixel ($SP_B$). Also, the cell gap ($D_R$) of the red(R)-colored sub-pixel ($SP_R$) is the same as a cell gap ($D_G$) of the green (G)-colored sub-pixel ($SP_G$).

The cell gap of each sub-pixel will be explained with reference to FIG. 2B. Referring to FIG. 2B, according to the increase of cell gap, a red(R)-colored light transmittance increases, and a blue(B)-colored light transmittance decreases. For improvement of the transmittance, it is preferable that the cell gap ($D_R$) of the red(R)-colored sub-pixel ($SP_R$) is larger than the cell gap ($D_B$) of the blue(B)-colored sub-pixel ($SP_B$). Especially, the cell gap ($D_B$) of the blue(B)-colored sub-pixel ($SP_B$) is set to a predetermined value capable of maximizing the transmittance of the blue(B)-colored sub-pixel ($SP_B$).

The cell gap for maximizing the red(R)-colored light transmittance is larger than the cell gap for maximizing the green (G)-colored light transmittance. In order to realize the maximum transmittance, the cell gap ($D_R$) of the red(R)-colored sub-pixel ($SP_R$) is larger than the cell gap ($D_G$) of the green (G)-colored sub-pixel($SP_G$), preferably. However, a process design may be complicated due to the different cell gaps. In this respect, if there is the slight difference of the transmittance, it is profitable to provide the same cell gap in the red(R)-colored sub-pixel ($SP_R$) and the green(G)-colored sub-pixel. ($SP_G$). In this reason, the LCD device according to one embodiment of the present invention is formed in such a manner that the cell gap ($D_R$) of the red (R)-colored sub-pixel ($SP_R$) is the same as the cell gap ($D_G$) of the green(G)-colored sub-pixel ($SP_G$). If attempting to maximize the transmittance to its utmost limit despite the slightly-complicated process design, the cell gap ($D_R$) of the red(R)-colored sub-pixel ($SP_R$) may be larger than the cell gap ($D_G$) of the green(G)-colored sub-pixel ($SP_G$).

In order to obtain the different cell gaps in the respective sub-pixels, the LCD device according to one embodiment of the present invention may be provided with the first substrate 100 whose thickness is differently set for each of the sub-pixels.

That is, in order to provide the red(R)-colored sub-pixel ($SP_R$) whose cell gap ($D_R$) is larger than the cell gap ($D_B$) of the blue(B)-colored sub-pixel ($SP_B$), the first substrate 100 is formed in such a manner that a thickness ($T_R$) of the first substrate 100 corresponding to the red(R)-colored sub-pixel ($SP_R$) is smaller than a thickness ($T_B$) of the first substrate 100 corresponding to the blue(B)-colored sub-pixel ($SP_B$).

In order to provide the red(R)-colored sub-pixel ($SP_R$) whose cell gap ($D_R$) is the same as the cell gap ($D_G$) of the green(G)-colored sub-pixel ($SP_G$), the first substrate 100 is formed in such a manner that the thickness ($T_R$) of the first substrate 100 corresponding to the red(R)-colored sub-pixel ($SP_R$) is the same as a thickness ($T_G$) of the first substrate 100 corresponding to the green(G)-colored sub-pixel ($SP_G$).

Hereinafter, the first substrate 100 with the different thicknesses for the respective sub-pixels in the LCD device according to the present invention will be described in detail as follows.

Figure 3:
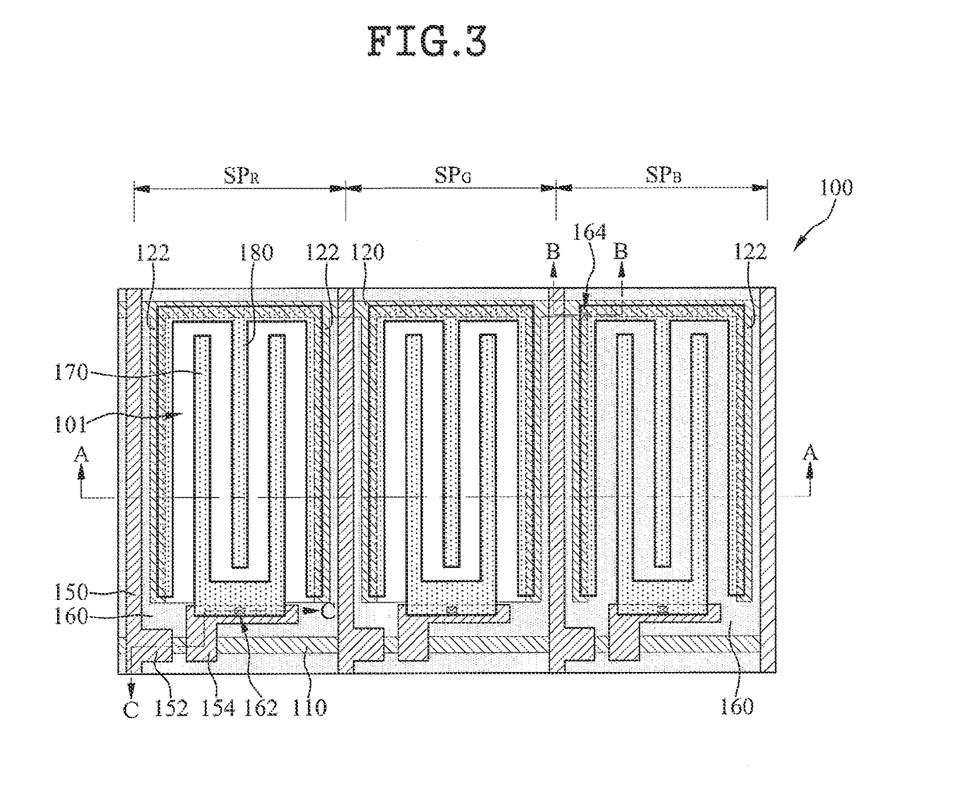
FIG. 3 is a plane view illustrating a first substrate in the LCD device according to one embodiment of the present invention.
Figure 4:
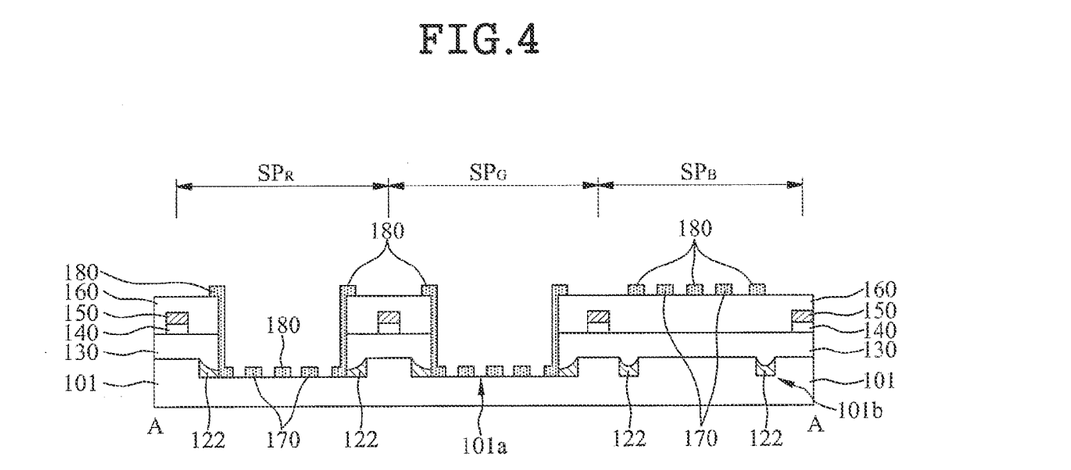
FIG. 4 is a cross section view along A-A of FIG. 3.
Figure 5:
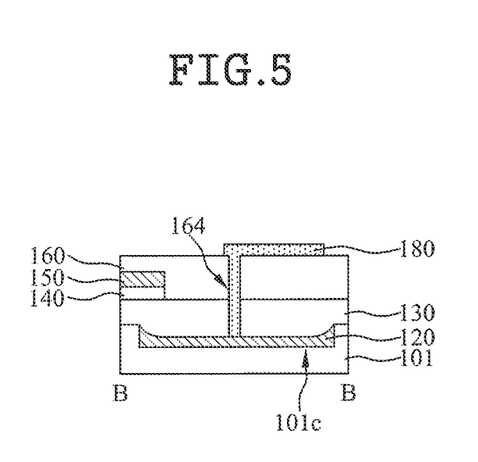
FIG. 5 is a cross section view along B-B of FIG. 3.
Figure 6:
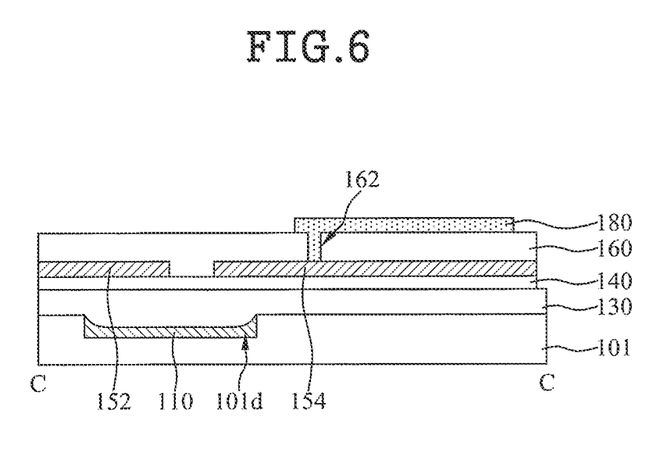
FIG. 6 is a cross section view along C-C of FIG. 3.

FIG. 3 is a plane view illustrating the first substrate in the LCD device according to one embodiment of the present invention. FIG. 4 is a cross section view along A-A of FIG. 3, FIG. 5 is a cross section view along B-B of FIG. 3. FIG. 6 is across section view along C-C of FIG. 3.

As shown in FIG. 3, the first substrate 100 for the LCD device according to one embodiment of the present invention comprises the red(R)-colored sub-pixel ($SP_R$), the green(G)-colored sub-pixel ($SP_G$), and the blue(B)-colored sub-pixel ($SP_B$).

Each of the sub-pixels is defined by a gate line 110 and a data line 150 crossing each other.

Also, a common line 120 is arranged in parallel to the gate line 110, and a first common electrode 122 is diverged from the common line 120. The first common electrode 122 is formed in each of the sub-pixels. The gate line 110, the common line 120, and the first common electrode 122 are made of the same material, and formed at the same layer.

The thin film transistor is formed at the crossing of the gate and data lines 110 and 150. A source electrode 152 is diverged from the data line 150; and a drain electrode 154 is formed to confront with the source electrode 152. Thus, the thin film transistor consists of the gate line 110, the source electrode 152, the drain electrode 154, and a semiconductor layer (not shown). Driving of each sub-pixel is switched by the thin film transistor. At this time, the data line 150, the source electrode 152, and the drain electrode 154 are made of the same material, and formed at the same layer.

A pixel electrode 170 and a second common electrode 180 are formed in each sub-pixel, wherein the pixel electrode 170 and the second common electrode 180 are arranged in parallel to apply an In-Plane electric field.

The pixel electrode 170 is electrically connected with the thin film transistor. In more detail, the pixel electrode 170 is electrically connected with the drain electrode 154 via a first contact hole 162.

When the second common electrode 180 and pixel electrode 170 are arranged in parallel, the second common electrode 180 alternate with the pixel electrode 170. Especially, the second common electrode 180 is electrically connected with the first common electrode 122 and the common line 120. At this time, the first common electrode 122 may be omissible. In order to prevent crosstalk between the data line 150 and the pixel electrode 170, it is preferable to form the first common electrode 122.

The electric connection between the second common electrode 180 and the first common electrode 122/common line 120 may be different among the red(R)-colored sub-pixel ($SP_R$), the green(G)-colored sub-pixel ($SP_G$), and the blue (B)-colored sub-pixel ($SP_B$). In more detail, in case of the red(R)-colored sub-pixel ($SP_R$) and the green/G)-colored sub-pixel ($SP_G$), the second common electrode 180 may be directly connected with the first common electrode 122 and the common line 120. In case of the blue(B)-colored sub-pixel ($SP_B$), the second common electrode 180 may be electrically connected with the first common electrode 122 or the common line 120 via a second contact hole 164. This will be described with reference to FIGS. 4 and 5.

In the LCD device according to one embodiment of the present invention, the first base 101 is exposed in the central portions of the red(R)-colored sub-pixel ($SP_R$) and the green (G)-colored sub-pixel ($SP_G$). However, the first base 101 is not exposed in the central portion of the blue(B)-colored sub-pixel ($SP_B$) since a passivation film 160 is formed in the central portion of the blue(B)-colored sub-pixel ($SP_B$).

Thus, while the thickness of first substrate 100 corresponding to the red(R)-colored sub-pixel ($SP_R$) is the same as the thickness of first substrate 100 corresponding to the green (G)-colored sub-pixel ($SP_G$), and the thickness of first substrate 100 corresponding to the red(R)-colored sub-pixel ($SP_R$) is smaller than the thickness of first substrate 100 corresponding to the blue(B)-colored sub-pixel ($SP_B$). This will be described with reference to FIG. 4.

As shown in FIG. 4, the red(R)-colored sub-pixel ($SP_R$) is formed in such a manner that it is the same as the green(G)-colored sub-pixel ($SP_G$), and is different from the blue(B)-colored sub-pixel ($SP_B$). Especially, in case of the red(R)-colored sub-pixel ($SP_R$) and the green(G)-colored sub-pixel ($SP_G$), they are relatively thin because of an empty space between each data line 150. However, the blue(B)-colored sub-pixel ($SP_B$) is relatively thick because there is no empty space between each data line 150. This will be explained in detail as follows.

In case of the red(R)-colored sub-pixel ($SP_R$) and the green (G)-colored sub-pixel ($SP_G$), a first groove 101a is provided in the first base 101, and is also formed in the entire region of the predetermined space between each data line 150. At this time, the first common electrode 122, the pixel electrode 170, and the second common electrode 180 may be received and positioned in the first groove 101a. However, predetermined portions of the leftmost and rightmost second common electrodes 180 may not be received and positioned inside the first groove 101a.

In case of the red(R)-colored sub-pixel ($SP_R$) and the green (G)-colored sub-pixel ($SP_G$), a gate insulating film 130 and a passivation film 160 are not formed under the pixel electrode 170 and some second common electrode 180, and the pixel electrode 170 and some second common electrode 180 are received and positioned in the first groove 101a of the first base 101, whereby the red(R)-colored sub-pixel ($SP_R$) and the green(G)-colored sub-pixel ($SP_G$) are relatively thin.

Meanwhile, in case of the blue(B)-colored sub-pixel ($SP_B$), a second groove 101b is formed in the first base 101. However, the second groove 101b is formed only in the partial portion of the predetermined space between each data line 150; and the first common electrode 122 is received and positioned in the second groove 101b. Thus, in case of the blue(B)-colored sub-pixel ($SP_B$), the gate insulating film 130 and the passivation film 160 are formed under the pixel electrode 170 and the second common electrode 180, whereby the blue(B)-colored sub-pixel ($SP_B$) is relatively thick.

On the first base 101, in particular, on the area of the first base 101 in which the first and second grooves 101a and 101b are not formed, there are the gate insulating film 130, the semiconductor layer 140, the data line 150, and the passivation film 160 sequentially formed thereon. However, the semiconductor layer 140 may not be formed under the data line 150. In this case, the data line 150 is formed on the gate insulating film 130.

Hereinafter, the structure of electrically connecting the second common electrode 180 with the first common electrode 122 and the common line 120 in each sub-pixel will be explained with reference to FIGS. 4 and 5.

As shown in FIG. 4, in case of the red(R)-colored sub-pixel ($SP_R$) and the green(G)-colored sub-pixel ($SP_G$), the leftmost and rightmost second common electrodes 180 are brought in contact with the lateral sides of the first common electrode 122, whereby the second common electrode 180 is directly connected with the first common electrode 122. Although not shown, the second common electrode 180 is directly connected with the common line 120.

Meanwhile, in case of the blue(B)-colored sub-pixel ($SP_B$), since the gate insulating film 130 and the passivation film 160 are formed between the second common electrode 180 and the first common electrode 122, it is impossible to directly connect the first and second common electrodes 122 and 180 with each other.

Thus, as shown in FIG. 5, in case of the blue(B)-colored sub-pixel ($SP_B$), the second contact hole 164 is formed in the gate insulating film 130 and the passivation film 160 above the common line 120, whereby the second common electrode 180 is electrically connected with the common line 120 via the second contact hole 164. Although not shown, the second contact hole 164 may be formed in the gate insulating film 130 and the passivation film 160 above the first common electrode 122, whereby the second common electrode 180 may be electrically connected with the first common electrode 122 via the second contact hole 164.

The common line 120 is formed inside a third groove 101c provided in the first base 101.

Hereinafter, the structure of the thin film transistor in each sub-pixel will be explained with reference to FIG. 6.

As shown in FIG. 6, a fourth groove 101d is formed in the first base 101, and the gate line 110 is received and positioned in the fourth groove 101d.

The gate insulating film 130 is formed on the entire surface of the first base 101 including the gate line 110; the semiconductor layer 140 is formed on the gate insulating film 130; and the source and drain electrodes 152 and 154 confronting each other are formed on the semiconductor layer 140.

Although not shown, the semiconductor layer 140 may comprise an active layer and an ohmic contact layer. The ohmic contact layer is in contact with the source and drain electrodes 152 and 154.

If using a half-tone mask, the semiconductor layer 140 and the source and drain electrodes 152 and 154 may be manufactured by one light exposure process. In this case, the semiconductor layer 140, and more particularly, the ohmic contact layer is formed in the same pattern as those of the source electrode 152, drain electrode 154 and the aforementioned data line 150.

The passivation film 160 is formed on the source and drain electrodes 152 and 154; and the first contact hole 162 is formed in the passivation film 160 above the drain electrode 154. Thus, the pixel electrode 170 is electrically connected with the drain electrode 154 via the first contact hole 162.

As mentioned above, the gate line 110, the common line 120, the first common electrode 122, the pixel electrode 170, and the second common electrode 180 are received and positioned in the grove of the first base 101 in the LCD device according to the present invention. In this case, if the groove has a large depth, the lines 110 and 120 and electrodes 122, 170, and 180 may be decreased in their widths, whereby a light-transmittance area is increased in the LCD device. Especially, since the gate line 110, the common line 120, and the first common electrode 122 generally formed of opaque metal are decreased in their widths, the light transmittance is improved considerably.

The aforementioned structures may be manufactured by various materials generally known in this technical field. Hereinafter, examples of the various materials for the respective structures will be explained as follows, but it is not limited to these examples.

Each of the gate line 110, the common line 120, the first common electrode 122, the data line 150, the source electrode 152, and the drain electrode 154 may be formed in a single-layered structure or multi-layered structure by using at least one of metal materials such as molybdenum (Mo), aluminum (Al), chrome (Cr), aurum (Au), titanium (Ti), nikel (Ni), neodymium (Nd), copper (Cu), and their alloys.

The gate insulating film 130 and the passivation film 160 may be formed of an inorganic-based material such as silicon oxide (SiOx) or silicon nitride (SiNx), or an organic-based material such as benzocyclobutene (BCB) or photo acryl.

The semiconductor layer 140 may be formed of a silicon-based material such as amorphous silicon or crystalline silicon. Especially, the ohmic contact layer constituting the semiconductor layer 140 may be formed by the silicon-based material doped with impurities.

The pixel electrode 170 and the second common electrode 180 may be formed of a transparent conductive material such as Indium Tin Oxide (ITO), Indium Zinc Oxide (IZO), or Zinc Oxide (ZnO).

The aforementioned explanation relates to the In-Plane Switching mode LCD device. However, the present invention is not limited to the In-Plane Switching mode LCD device.

FIGS. 7A to 7I are cross section views illustrating a method for manufacturing the first substrate of the LCD device according to one embodiment of the present invention which are cross section views along A-A of FIG. 3.

Figure 7A:
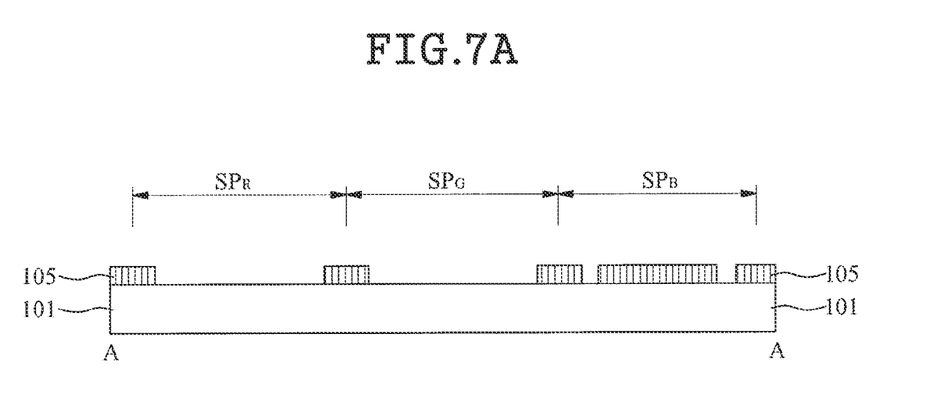
FIGS. 7A to 7I are cross section views illustrating a method for manufacturing the first substrate in the LCD device according to one embodiment of the present invention.

First, as shown in FIG. 7A, a first photoresist pattern 105 is formed on the first base 101.

The first photoresist pattern 105 may be formed by photolithography.

Figure 7B:
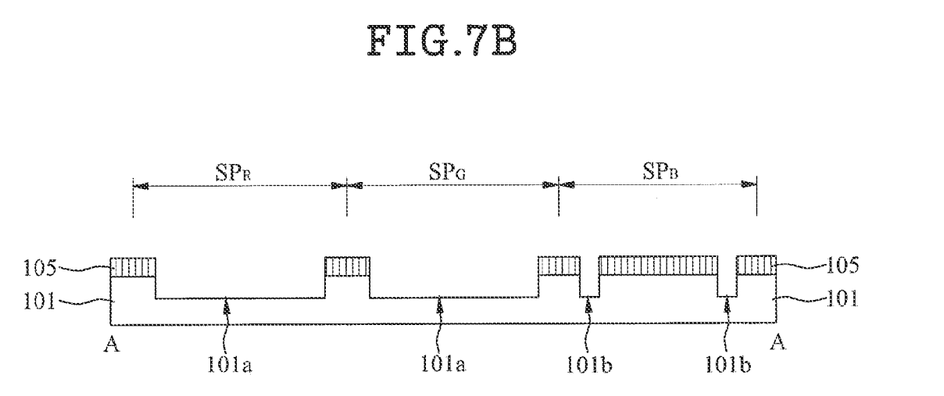

Then, as shown in FIG. 7B, under the conditions that the first photoresist pattern 105 is used as a mask, a predetermined portion of the first base 101 is etched so that the first and second grooves 101a and 101b are formed in the first base 101.

Referring to the above FIG. 4, the first groove 101a is formed in the red(R)-colored sub-pixel ($SP_R$) and the green (G)-colored sub-pixel ($SP_G$), whereby the first common electrode 122, the pixel electrode 170, and the second common electrode 180 are received and positioned in the first groove 101a. Also, the second groove 101b is formed in the blue(B)-colored sub-pixel ($SP_B$), whereby the first common electrode 122 is received and positioned in the second groove 101b.

Although not shown, the process of forming the third groove (See the aforementioned '101c' of FIG. 5) for receiving the common line and the process of forming the fourth groove (See the aforementioned '101d' of FIG. 6) for receiving the gate line may be carried out simultaneously with the process of forming the first and second grooves 101a and 101b.

Figure 7C:
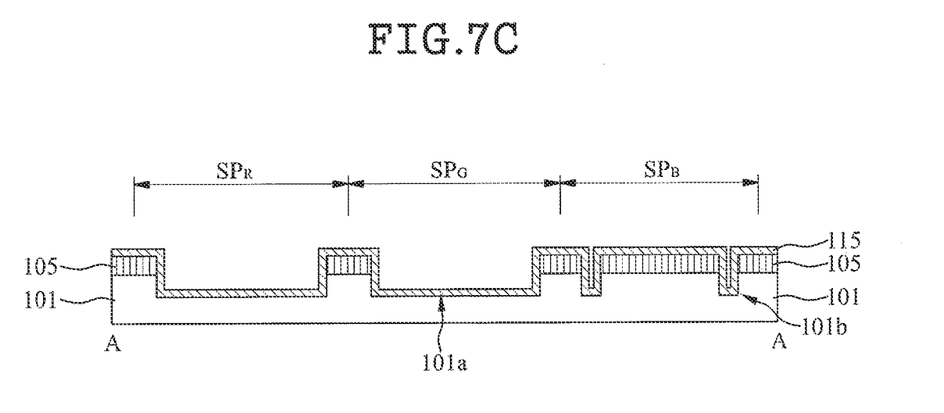

Then, as shown in FIG. 7C, a conductive material layer 115 is formed on the entire surface of the first base 101 including the first photoresist pattern 105. The conductive material layer 115 may be formed by sputtering.

Figure 7D:
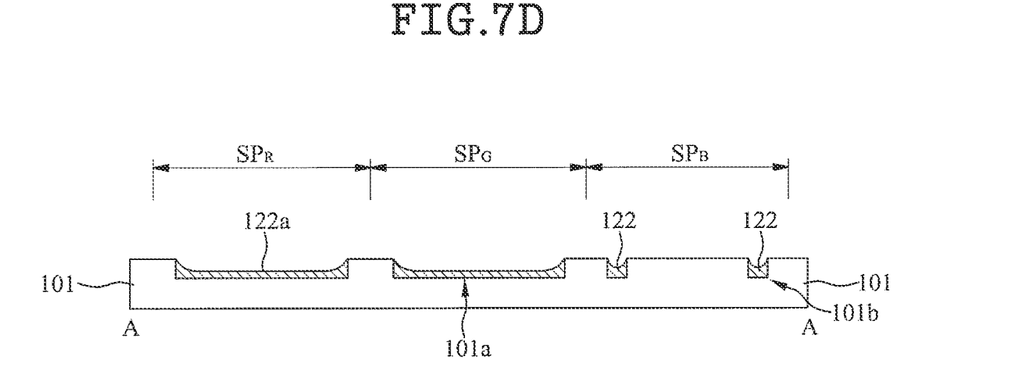

As shown in FIG. 7D, after removing the first photoresist pattern 105 and the conductive material layer 115 above the first photoresist pattern 105, the conductive material layer 115 remains in the first and second grooves 101a and 101b.

At this time, a first common electrode pattern layer 122a of the red(R)-colored sub-pixel ($SP_R$) and the green(G)-colored sub-pixel ($SP_G$) is formed by the conductive material layer 115 remaining in the first groove 101a. Also, the first common electrode 122 of the blue(B)-colored sub-pixel ($SP_B$) is formed by the conductive material layer 115 remaining in the second groove 101b.

Although not shown, the conductive material layer remains in the third groove (See the aforementioned '101c' of FIG. 5) and the fourth groove (See the aforementioned '101d' of FIG. 5) by the aforementioned process, whereby the common line 120 is formed by the conductive material layer remaining in the third groove (See the aforementioned '101c' of FIG. 5), and the gate line 110 is formed by the conductive material layer remaining in the fourth groove (See the aforementioned '101d' of FIG. 5).

Figure 7E:
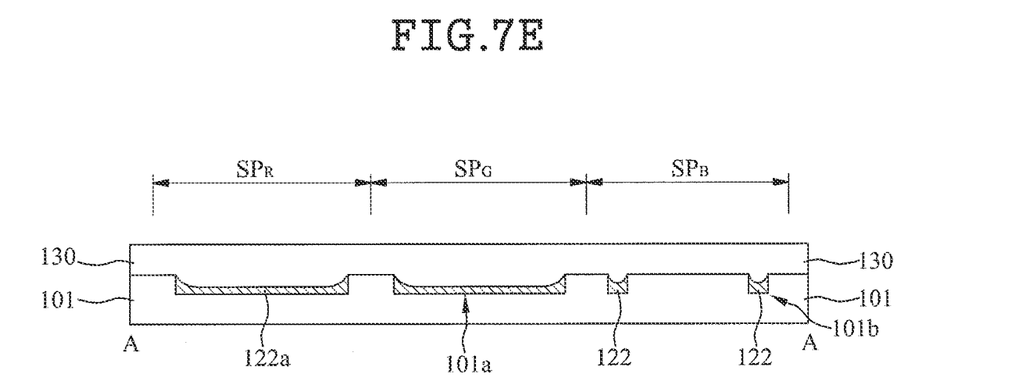

As shown in FIG. 7E, the gate insulating film 130 is formed on the entire surface of the first base 101. The gate insulating film 130 may be formed by PECVD (Plasma Enhanced Chemical Vapor Deposition).

Figure 7F:
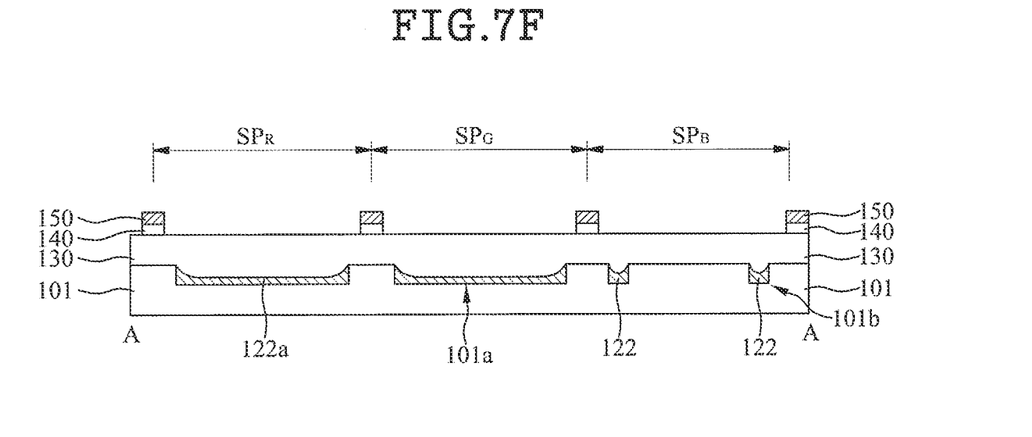

As shown in FIG. 7F, the semiconductor layer 140 and the data line 150 are formed on the gate insulating film 130. Although not shown, the source electrode (See the aforementioned '152' of FIG. 3) and the drain electrode (See the aforementioned '154' of FIG. 3) are formed together with the data line 150.

In more detail, the semiconductor layer 140 is deposited on the gate insulating film 130 by PECVD; the metal layer is deposited by sputtering; and then semiconductor layer 140, the data line 150, the source electrode (See the aforementioned '152' of FIG. 3), and the drain electrode (See the aforementioned '154' of FIG. 3) are patterned by photolithography. As mentioned above, if using the half-tone mask for the photolithography, the semiconductor layer 140, the data line 150, the source electrode (See the aforementioned '152' of FIG. 3), and the drain electrode (See the aforementioned '154' of FIG. 3) are formed by one light exposure process.

Figure 7G:
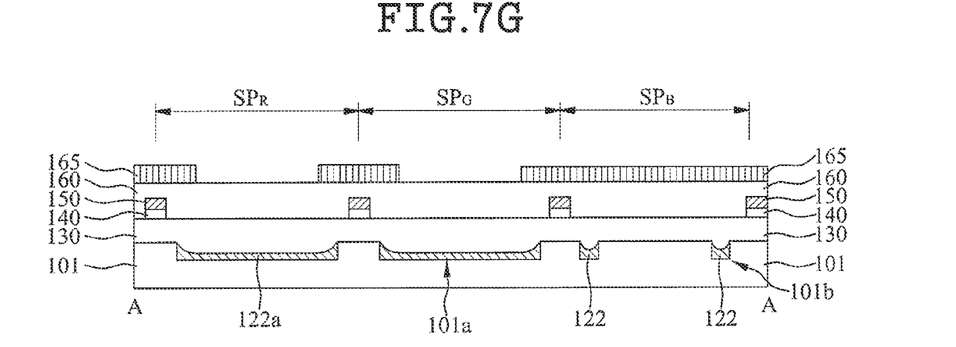

As shown in FIG. 7G, the passivation film 160 is formed on the entire surface of the first base 101 including the data line 150. Then, a second photoresist pattern 165 is formed on the passivation film 160.

Figure 7H:
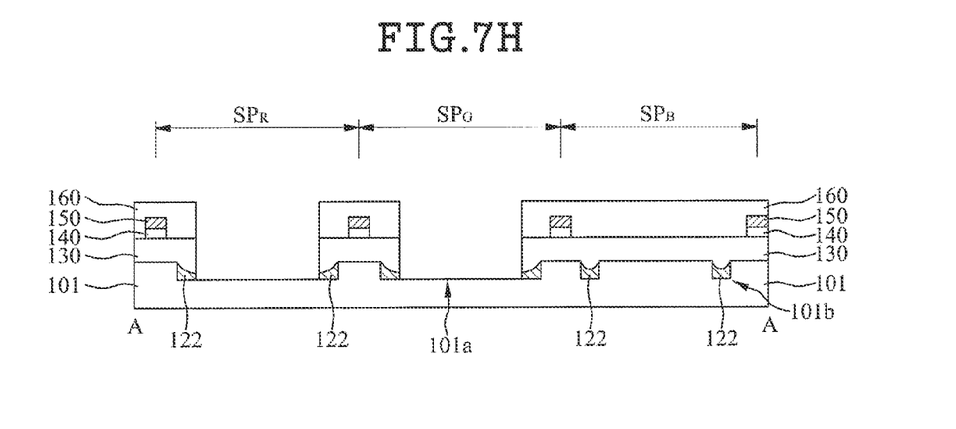

As shown in FIG. 7H, under the conditions that the second photoresist pattern 165 is used as a mask; the predetermined portions of the passivation film 160, gate insulating film 130, and first common electrode pattern layer 122a are partially removed from the red(R)-colored sub-pixel ($SP_R$) and the green(G)-colored sub-pixel ($SP_G$). The first common electrode 122 is formed by the remaining first common electrode pattern layer 122a in the red(R)-colored sub-pixel ($SP_R$) and the green(G)-colored sub-pixel ($SP_G$).

After the aforementioned process, the first contact hole (See the aforementioned '162' of FIG. 6) is formed by removing the predetermined portion of the passivation film 160, and simultaneously, the second contact hole (See the aforementioned '164' of FIG. 5) is formed by removing the predetermined portions of the gate insulating film 130 and the passivation 160. At this time, if forming the second photoresist pattern 165 with step coverage through the use of half-tone mask, there is no need to carry out an additional exposure process for forming the first and second contact holes 162 and 164.

Figure 7I:
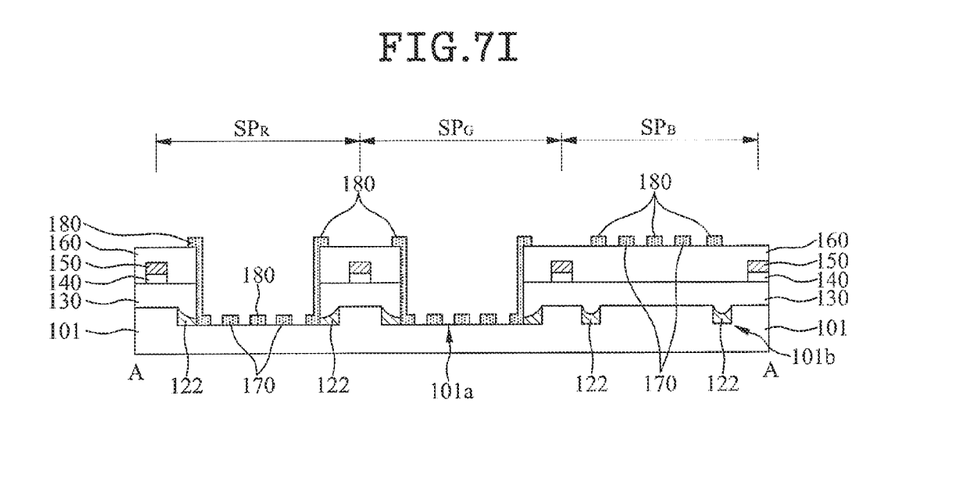

As shown in FIG. 7I, the LCD device according to one embodiment of the present invention is completed by alternately arranging the pixel electrode 170 and the second common electrode 180. The pixel electrode 170 and the second common electrode 180 may be patterned by sputtering and photolithography.

Although not shown, the pixel electrode 170 is electrically connected with the drain electrode 154 via the first contact hole 162; and the second common electrode 180 is electrically connected with the common line 120 via the second contact hole 164, The above explanation relates to the process of manufacturing the first substrate for the LCD device according to one embodiment of the present invention. As explained above, the LCD device according to one embodiment of the present invention may be manufactured by steps of manufacturing the first substrate 100; manufacturing the second substrate 200 by sequentially forming a light-shielding layer, a color filter layer, and an overcoat layer; and forming the liquid crystal layer between the first and second substrates 100 and 200.

The process of forming the liquid crystal layer the first and second substrates 100 and 200 may be carried out by a liquid crystal injection method or liquid crystal dispensing method. The liquid crystal injection method for forming the liquid crystal layer between the first and second substrates 100 and 200 comprises coating a sealant with a predetermined inlet on any one of the first and second substrates 100 and 200; injecting the liquid crystal through the inlet of the sealant after bonding the first and second substrates 100 and 200 to each other; and sealing the inlet of the sealant. The liquid crystal dispensing method for forming the liquid crystal layer between the first and second substrates 100 and 200 comprises coating a closed-type sealant without an inlet on any one of the first and second substrates 100 and 200; dispensing the liquid crystal onto any one of the first and second substrates 100 and 200; and bonding the first and second substrates 100 and 200 to each other.

Accordingly, the LCD device according to the present invention is designed in such a manner that the first substrate is provided with the different thicknesses for the respective sub-pixels. That is, the first substrate of the LCD device according to the present invention is designed to enable the optimal cell gap for each sub-pixel, to thereby improve the light transmittance for each colored light.

Also, the groove is formed in the base constituting the first substrate, and the lines and electrodes are received and positioned in the groove, whereby the decreased width of the lines and electrodes enables improvement of the light transmittance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device, comprising:
   first and second substrates confronting each other;
   a liquid crystal layer between the first and second substrates; and
   first, second, and third sub-pixels, wherein a cell gap of the first sub-pixel is larger than a cell gap of the third sub-pixel, and
   wherein the first substrate comprises: a first base having a first groove in the first sub-pixel, a passivation film on the first base, a pixel electrode in the first sub-pixel positioned in the first groove, and a pixel electrode in the third sub-pixel positioned on the passivation film,
   wherein: the first substrate corresponding to the first sub-pixel comprises:
   gate and data lines crossing each other on the first base;
   a thin film transistor at the crossing of the gate and data lines;
   the pixel electrode electrically connected with the thin film transistor;
   a common electrode arranged in parallel to the pixel electrode; and
   a common line for applying a common voltage to the common electrode; and
   wherein the gate line, the common line, and the common electrode are received and positioned in the first groove of the first base.

2. The LCD device according to claim 1, wherein:
   the first sub-pixel corresponds to a red-colored sub-pixel;
   the second sub-pixel corresponds to a green-colored sub-pixel; and
   the third sub-pixel corresponds to a blue-colored sub-pixel.

3. The LCD device according to claim 2, wherein the cell gap of the first sub-pixel is the same as a cell gap of the second sub-pixel.

4. The LCD device according to claim 3, wherein:
   a thickness of the first substrate corresponding to the first sub-pixel is the same as a thickness of the first substrate corresponding to the second sub-pixel; and the thickness of the first substrate corresponding to the first sub-pixel is smaller than a thickness of the first substrate corresponding to the third sub-pixel.

5. The LCD device according to claim 1, wherein:
the common electrode comprises: a first common electrode diverged from the common line; and a second common electrode electrically connected with the first common electrode and arranged alternately with the pixel electrode; and
the first common electrode and the second common electrode are received and positioned in the first groove of the first base.

6. An LCD device comprising:
first and second substrates confronting each other;
a liquid crystal layer between the first and second substrates; and
first, second, and third sub-pixels, wherein a cell gap of the first sub-pixel is larger than a cell gap of the third sub-pixel,
wherein the first substrate comprises a first base having a first groove in the first sub-pixel, a passivation film on the first base, a pixel electrode in the first sub-pixel positioned in the first groove, and a pixel electrode in the third sub-pixel positioned on the passivation film, and
wherein: the first substrate corresponding to the third sub-pixel comprises:
gate and data lines crossing each other on the first base;
a thin film transistor at the crossing of the gate and data lines;
the pixel electrode electrically connected with the thin film transistor;
a common electrode arranged in parallel to the pixel electrode; and
a common line for applying a common voltage to the common electrode;
the first base further comprises a second groove in the third sub-pixel; and
the gate line and the common line are received and positioned in the second groove of the first base.

7. The LCD device according to claim 6, wherein:
the common electrode comprises:
a first common electrode diverged from the common line; and
a second common electrode electrically connected with the first common electrode and arranged alternately with the pixel electrode; and
the first common electrode is received and positioned in the second groove of the first base.

* * * * *